(12) United States Patent
Vetter et al.

(10) Patent No.: US 9,044,723 B2
(45) Date of Patent: Jun. 2, 2015

(54) INCLINED BASEPLATE IN DEHYDROGENATION REACTOR

(71) Applicant: UOP LLC, Des Plaines, IL (US)

(72) Inventors: Michael J. Vetter, Schaumburg, IL (US); Sujay Krishnamurthy, Hoffman Estates, IL (US); Laura E. Loenard, Western Springs, IL (US); Paul A. Sechrist, South Barrington, IL (US); Angelo P. Furfaro, Arlington Heights, IL (US); Quan Yuan, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 204 days.

(21) Appl. No.: 13/852,110

(22) Filed: Mar. 28, 2013

(65) Prior Publication Data

US 2014/0294682 A1    Oct. 2, 2014

(51) Int. Cl.
| | | |
|---|---|---|
| *B01J 8/02* | (2006.01) |
| *B01J 8/00* | (2006.01) |
| *B01J 19/00* | (2006.01) |
| *B01J 19/30* | (2006.01) |
| *B01J 35/00* | (2006.01) |
| *B01J 35/02* | (2006.01) |
| *C07C 5/32* | (2006.01) |

(52) U.S. Cl.
CPC .............. *B01J 8/008* (2013.01); *B01J 8/0214* (2013.01); *B01J 2208/00884* (2013.01); *B01J 2208/00938* (2013.01)

(58) Field of Classification Search
CPC .............. B01J 8/00; B01J 8/008; B01J 8/02; B01J 8/0207; B01J 8/0221; B01J 8/0242; B01J 8/0257; B01J 19/00; B01J 19/30; B01J 19/305; B01J 35/00; B01J 35/02; B01J 2208/00743; B01J 2208/00761; B01J 2208/00796; B01J 2208/00938; B01J 2208/02; C07C 5/32; C07C 5/321

See application file for complete search history.

(56) References Cited

U.S. PATENT DOCUMENTS

| | | | |
|---|---|---|---|
| 2,533,945 A | 12/1950 | Legatski | |
| 3,706,536 A * | 12/1972 | Greenwood et al. | 422/634 |
| 4,374,094 A | 2/1983 | Farnham | |
| 5,165,900 A | 11/1992 | Miksitz | |
| 5,527,512 A | 6/1996 | Bachtel et al. | |
| 6,472,577 B1 | 10/2002 | Zimmermann et al. | |
| 6,569,389 B1 | 5/2003 | Koves et al. | |
| 7,776,293 B2 | 8/2010 | Downs et al. | |
| 8,057,601 B2 | 11/2011 | Koelmel et al. | |
| 8,071,047 B2 | 12/2011 | Krishnamurthy | |
| 2003/0054096 A1 * | 3/2003 | Tschudin | 427/212 |
| 2008/0219898 A1 | 9/2008 | Gregor et al. | |
| 2009/0142240 A1 | 6/2009 | Vetter et al. | |
| 2011/0245561 A1 | 10/2011 | Merrill et al. | |

FOREIGN PATENT DOCUMENTS

| | | |
|---|---|---|
| JP | 3431216 B2 | 7/2003 |
| KR | 2010047247 A | 5/2010 |

OTHER PUBLICATIONS

Search Report dated Jul. 24, 2014 for corresponding PCT Appl. No. PCT/US2014/031804.

* cited by examiner

*Primary Examiner* — Natasha Young

(57) ABSTRACT

An inclined baseplate for a radial bed reactor improves solids flow from the bottom of the reactor. Gas flow can be improved by utilizing an aerated baseplate or by providing a non-porous section of outer perforated cylinder in the area below the level of the bottom of the inner perforated cylinder.

19 Claims, 5 Drawing Sheets

US 9,044,723 B2

INCLINED BASEPLATE IN DEHYDROGENATION REACTOR

BACKGROUND OF THE INVENTION

A wide variety of processes use cross flow reactors to provide for contact between a fluid and a solid. The solid usually comprises a catalytic material on which the fluid reacts to form a product. The processes cover a range of processes, including hydrocarbon conversion, gas treatment, and adsorption for separation.

Cross flow reactors are often radial flow reactors and are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst.

In radial bed reactors with substantially continuous catalyst circulation, the forces exerted on the catalyst by the gas flow must be considered to ensure uninhibited catalyst movement. The direction of the gas flow through the catalyst bed is generally perpendicular to the desired direction of catalyst movement in the active bed. Under the right conditions, excessive gas velocities may impact catalyst movement either by holding up solids flow or creating a void space. Both are undesired affects which will adversely impact the flow of catalyst.

Among the processes utilizing radial flow reactors, the dehydrogenation of hydrocarbons is an important commercial hydrocarbon conversion process because of the existing and growing demand for dehydrogenated hydrocarbons for the manufacture of various chemical products such as detergents, high octane gasolines, oxygenated gasoline blending components, pharmaceutical products, plastics, synthetic rubbers, and other products which are well known to those skilled in the art.

The production of olefins by means of catalytic dehydrogenation of paraffinic hydrocarbons is well known to those skilled in the art of hydrocarbon conversion processing. Many patents discuss the dehydrogenation of hydrocarbons in general, such as for example, U.S. Pat. No. 4,430,517 (Imai et al), which discusses a dehydrogenation process and catalyst for use therein.

FIG. 1 illustrates one type of radial bed reactor 10. Catalyst enters the top of surge hopper 15 and flows into annular bed 20 as catalyst is withdrawn from the bottom of bed 20 via catalyst transfer lines 25. Inner perforated cylinder 30 and outer perforated cylinder 35 retain catalyst in annular catalyst bed 20 and at least partially define boundaries of distribution space 40 and collection space 45. As illustrated, there is an optional central distributor plug 50 which occupies the central portion of reactor 10 surrounded by inner perforated cylinder 30 and serves to distribute incoming reactants while minimizing the volume of distribution space 40. Reactants enter distribution space 40 through closed conduit section 55 that extends to the bottom of inner perforated cylinder 30. Collection space 45 on the outside of outer perforated cylinder 35 serves as a collection zone that supplies the reactor effluent for discharge through nozzle 60. The base plate 65 at the bottom of the catalyst bed 20 is flat.

However, under certain conditions this arrangement may allow the catalyst to become stagnant at the bottom the bed.

Therefore, a reactor with improved flow characteristics would be desirable.

SUMMARY OF THE INVENTION

One aspect of the invention is a radial bed reactor with an inclined baseplate. In one embodiment, the reactor comprises a reactor body. Inner and outer perforated cylinders define a catalyst bed, the catalyst bed having an inlet at an upper end and an outlet at a lower end. A first portion of the outer perforated cylinder extends below a bottom of the inner perforated cylinder, and the first portion has a non-porous section. A baseplate extends from the bottom of the inner perforated cylinder toward the bottom of the outer perforated cylinder, and is inclined with respect to the inner perforated cylinder. There is a distribution space defined by at least the inner perforated cylinder, and a collection space defined by the outer perforated cylinder and the reactor body. The distribution space has a feed inlet, and the collection space has a product outlet.

Another embodiment of the radial bed reactor with an inclined baseplate comprises a reactor body with a central distributor plug. Inner and outer perforated cylinders define a catalyst bed, the catalyst bed having an inlet at an upper end and an outlet at a lower end. The outer perforated cylinder extends below the bottom of the inner perforated cylinder. A baseplate extends from the bottom of the inner perforated cylinder toward the bottom of the outer perforated cylinder, is inclined with respect to the inner perforated cylinder, and has at least one porous portion. There is a distribution space defined by at least the inner perforated cylinder, and a collection space defined by the outer perforated cylinder and the reactor body. The distribution space has a feed inlet, and the collection space has a product outlet.

DETAILED DESCRIPTION OF THE INVENTION

An inclined baseplate for a radial bed reactor improves solids flow from the bottom of the reactor. Gas flow can be improved by utilizing an aerated baseplate or by providing a non-porous section of outer perforated cylinder in the area below the level of the bottom of the inner perforated cylinder.

The process equipment as described herein is useful for any process that benefits from substantially continuous catalyst circulation in a radial bed reactor. Examples of such processes include, but are not limited to, dehydrogenation of paraffins, naphtha reforming, and dehydrocyclodimerization.

Figure 1:
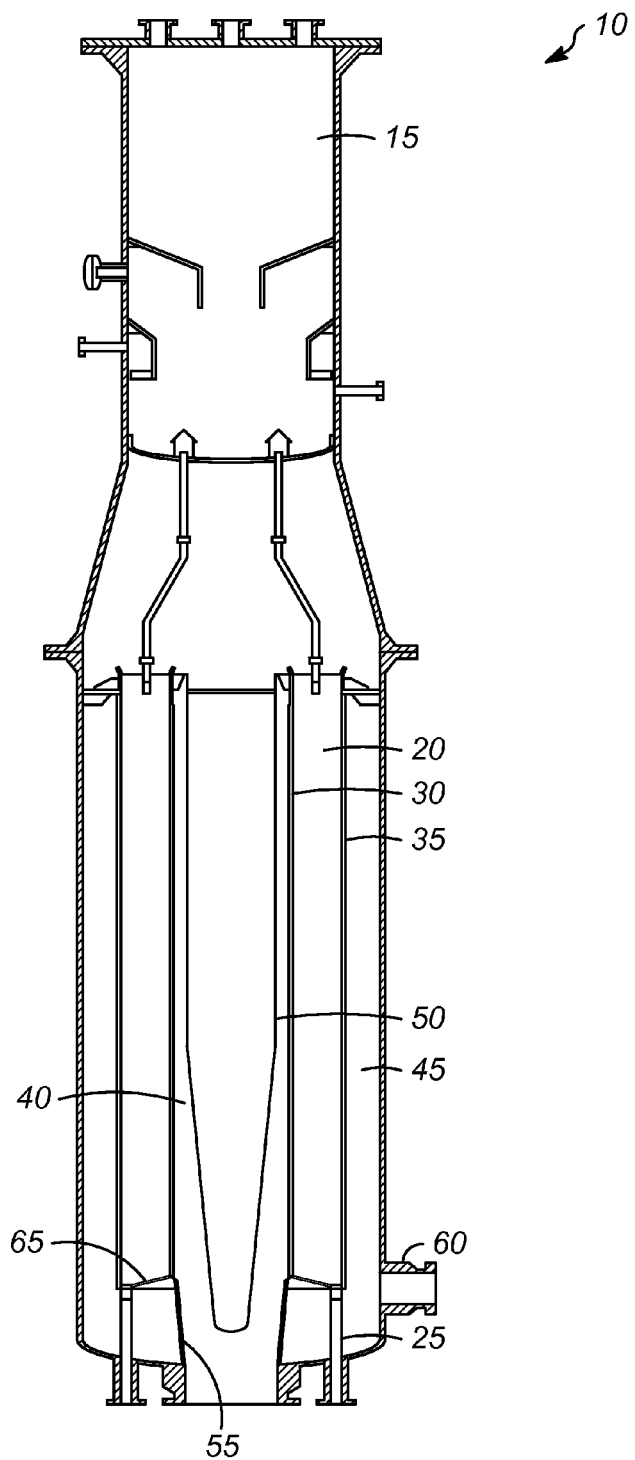
FIG. 1 is an illustration of an embodiment of a prior art radial bed reactor.
Figure 2:
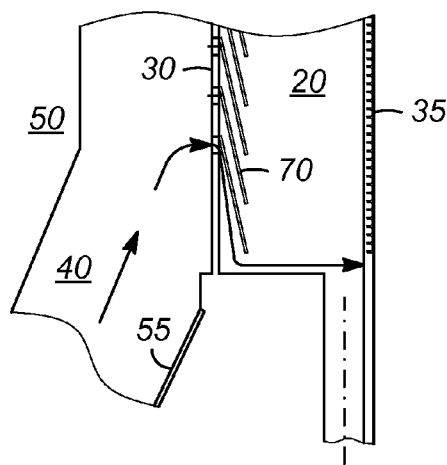
FIG. 2 is an illustration of a portion of the bottom of the radial bed reactor of FIG. 1.

FIG. 2 illustrates the flow pattern of the feed at the bottom of the catalyst bed with a flat base plate. Feed enters the distribution space 40 and flows upward through closed conduit section 55 until is reaches the inner perforated cylinder 30 where it begins to flow outward through the perforated cylinder and into the catalyst bed 20. Louvers 70 on the catalyst bed side of the inner perforated cylinder 30 deflect the feed downward. When it reaches the bottom of the louver it flows outward through the catalyst bed 20.

Figure 3:
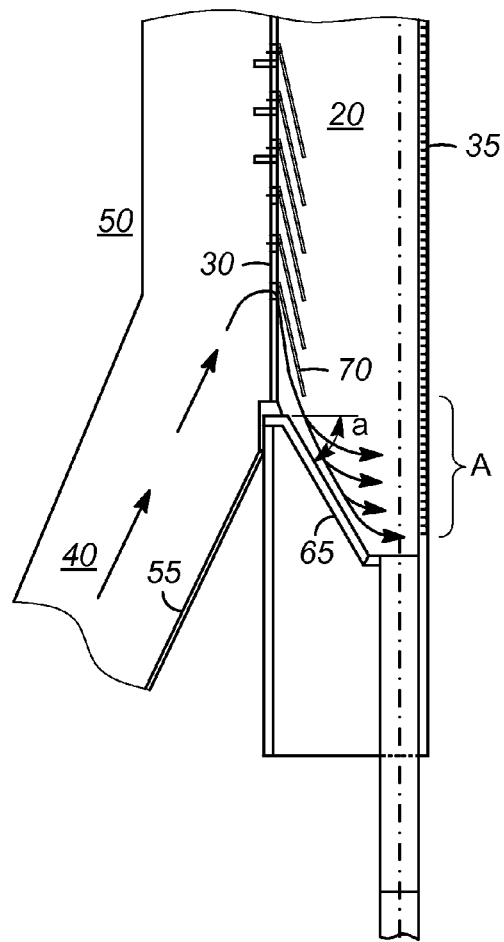
FIG. 3 is an illustration of a portion of a radial bed reactor with an inclined baseplate.

In order to improve the catalyst flow at the bottom of the reactor, an inclined base plate was developed, as illustrated in FIG. 3. The incline of the base plate 65 increases the length of the outer perforated cylinder 35 by a distance A which extends below the level of the bottom of the lowest louver 70.

The inclined baseplate provided improved solids flow from the bottom of the catalyst bed. The slope is typically in the range of about 30° to about 85°, or about 40° to about 80°, or about 45° to about 75°, or about 50° to about 70°, or about 55° to about 65°.

The inclined baseplate improved the solids motion and eliminated the solids stagnation problem. However, the gas flow pattern in the lower portion of the reactor was found to be negatively affected, which increased the possibility of void blowing and/or solids holdup. The localized vapor flow distribution is a function of the inclined baseplate and the corresponding outer perforated cylinder extended open area. The downstream expanded open area with an inclined baseplate enables localized vapor flow expansion across the catalyst bed depth.

As illustrated in FIG. 3, the feed enters the distribution space 40 and flows upward as before, through the inner perforated cylinder 35 where it is directed downward by louvers 70. The outer perforated cylinder 35 extends below the level of the bottom louver a height A which is the height of the inclined baseplate 65. The downstream expanded open area A and flow expansion allows more flow locally to satisfy the static pressure difference driving distribution. The amount of additional localized vapor flow can be interfere with local solids free surface, solids bed disturbance, and solids flow in the bottom of the bed.

The vapor flow through the reactor components including catalyst bed 20 can be studied using computational fluid dynamics (CFD). These numerical experiments have revealed that the configuration of the process equipment can impact the vapor flow patterns resulting is zones with high local velocity. Of particular interest for the current invention is the impact of the reactor equipment near the bottom of the reactor and catalyst withdrawal pipes 25. In one example, the flow rate of vapor through the lower portion of inner perforated cylinder 30 is higher than the average as a result of the additional outlet area for the gas flow to exit the bed corresponding to the height A of the inclined baseplate. The baseplate and outer perforated cylinder configuration below the end of the inner perforated cylinder have the most significant impact on the vapor flow in the bottom 5% of the inner perforated cylinder and the locally high flow rates in this section may cause radial vapor velocity in excess of the threshold void velocity.

To counter this problem, one embodiment of the invention involves providing aerated inclined baseplates for improved solids flow and hydraulically balanced localized vapor flow to distribute the inlet flow uniformly to the bottom of the reactor. Supplemental vapor flow of a slipstream of inlet feed flow reduces the hydraulic distribution to the bottom louver. Another embodiment uses externally routed hydrogen as the supplemental vapor flow; this arrangement will have the added benefit of stripping or partially stripping sulfur as $H_2S$ from the catalyst in the sloped section of the reactor as well as hydraulically balance the localized vapor flow distribution, the reasons for which are described in U.S. application Ser. No. 13/424,874, filed Mar. 20, 2012, entitled Process for Managing Sulfur on Catalyst in a Light Paraffin Dehydrogenation Process, which is incorporated herein by reference. Both options enable less flow to the bottom louver and even the distribution across the radial catalyst bed so that the solids flow from the bottom of the reactor is not negatively affected.

Figure 4:
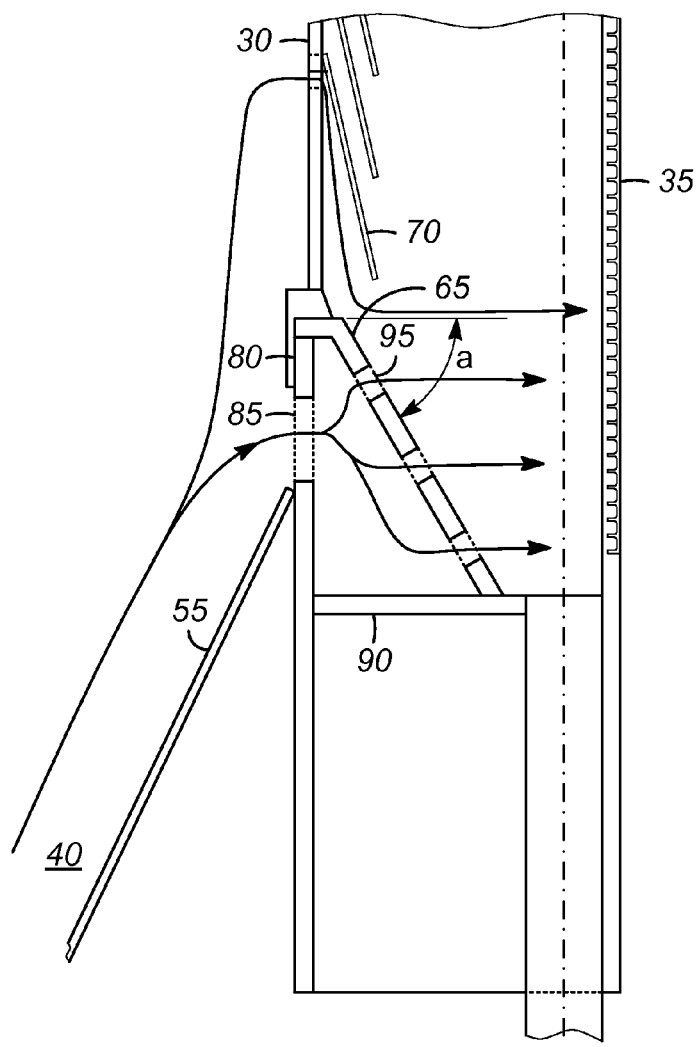
FIGS. 4-4A are illustrations of one embodiment of an inclined baseplate with porous sections.
Figure 4A:
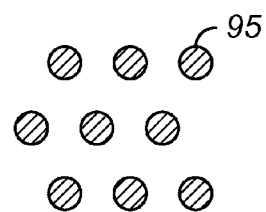

FIGS. 4-4A illustrate one embodiment of an aerated baseplate. The feed flows upward through the distribution space through the inner perforated cylinder 30 where it is deflected downward by the louvers 70 as before. Below the inner perforated cylinder 30, there is an extension plate 80 with an opening 85. An optional support plate 90 connects the extension plate 80 with the bottom of the inclined baseplate 65. As shown, the support plate 90 is solid, but this is not required.

A portion of the feed flows through the opening 85 and on through one or more porous portion 95 in the inclined baseplate 65. As shown, the porous portions 95 are holes covered with profile wire, wire mesh, slotted perforated material, and the like for catalyst containment.

Figure 5:
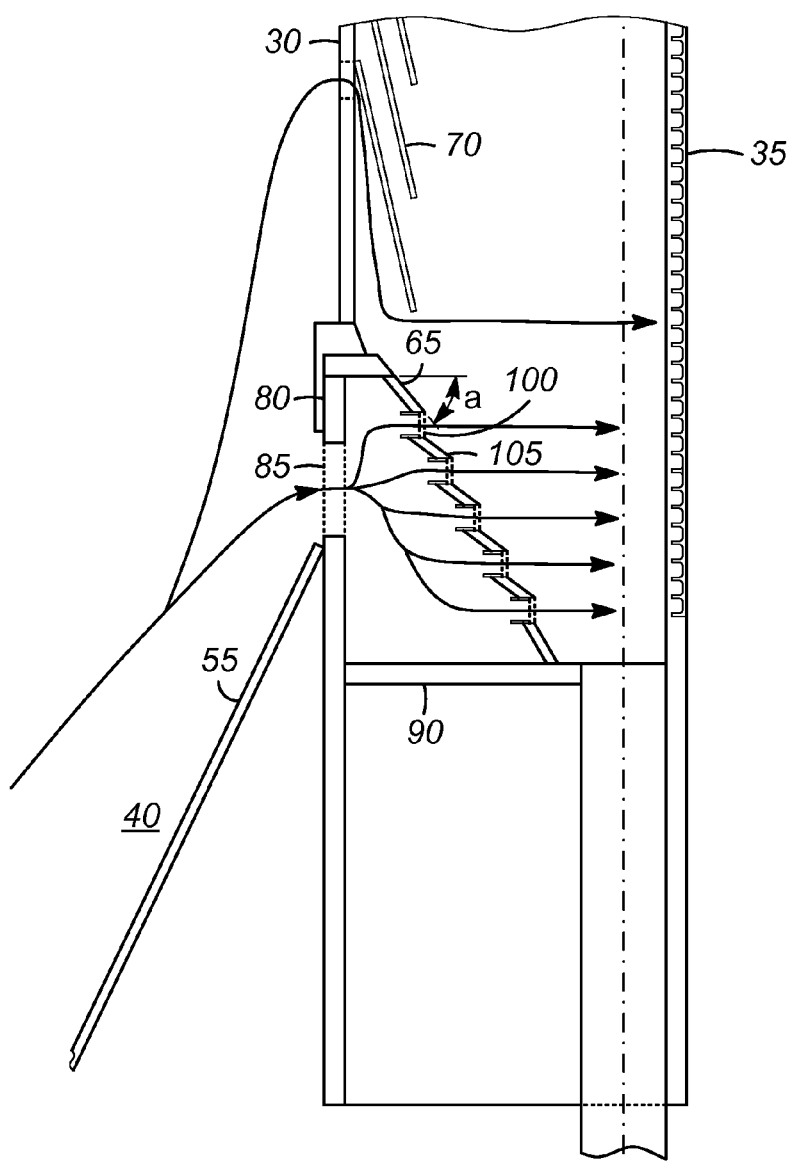
FIG. 5 is an illustration of another embodiment of an inclined baseplate with porous sections.

Another embodiment is shown in FIG. 5. The inclined plate 65 has one or more alternating porous portions 100 and non-porous portions 105. The porous sections 100 are cylindrical sections made of profile wire, wire mesh, slotted perforated material and the like. The porous sections desirably extend around the entire circumference of the reactor, although this is not required.

A portion of the feed flows through the opening 85 and the porous sections 105 in the inclined baseplate 65.

Figure 6:
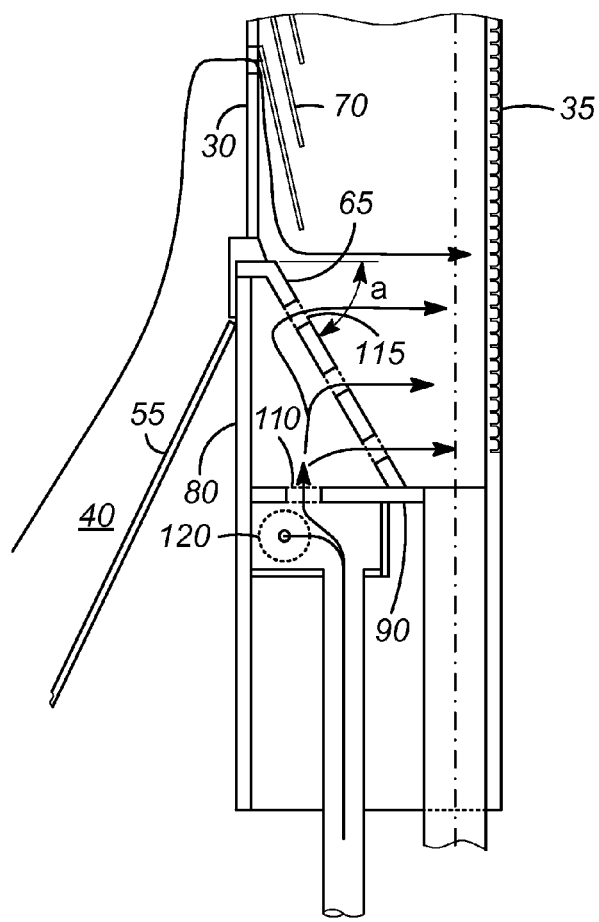
FIG. 6 is an illustration of another embodiment of an inclined baseplate with porous sections.

FIG. 6 illustrates another embodiment. Extension plate 80 is solid, and there is an opening 110 in the support plate 90. A gas, such as hydrogen, flows through the opening 110 and on through porous portions 115 in the baseplate 65. A plenum 120 below the baseplate can distribute the gas around the circumference of the reactor. When hydrogen is used as the gas, sulfur can be removed as $H_2S$.

These embodiments enable less flow of feed to the bottom louver, and an even distribution across the radial catalyst bed that does not detrimentally affect the solids flow from the bottom of the reactor.

Another solution to the problem is making at least a part of the outer perforated cylinder non-porous below the level of the bottom of the inner perforated cylinder. In some embodiments, the entire portion below the level of the bottom of the inner perforated cylinder is non-porous. However, this could cause solids flow problems and an excessively high negative pressure gradient at the top edge of the non-porous portion due to the up flow of gas.

In other embodiments, there is a portion of the outer perforated cylinder below the level of the bottom of the inner perforated cylinder which is porous. This is desirably at or near the bottom of the outer perforated cylinder.

Figure 7:
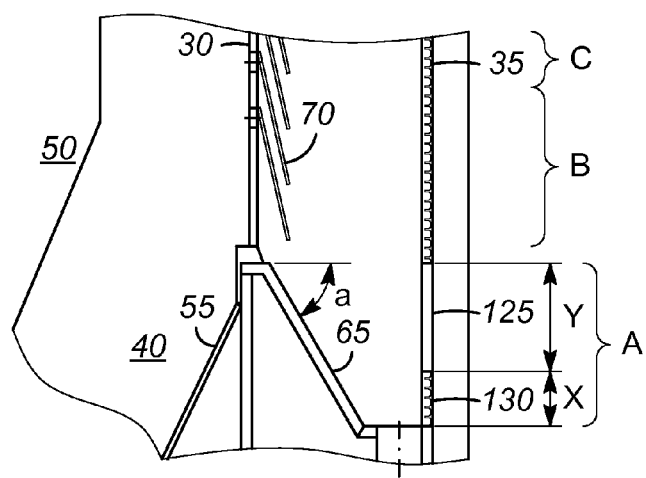
FIG. 7 is an illustration of an embodiment of an inclined baseplate with an outer perforated cylinder having a non-porous section.

FIG. 7 illustrates one embodiment having a non-porous section of the outer perforated cylinder. The outer perforated cylinder has a portion below the level of the bottom of the inner perforated cylinder of height A which is the height of the baseplate 65. There is non-porous section 125 of height Y and a porous section 130 of height X below the non-porous section 125.

The porous section 130 allows the gas to exit the catalyst bed from the bottom section of the reactor, promoting a downward flow pattern in the bed. The hole size and fraction of open area for porous section 130 may be the same or different from the hole size and fraction of open area for the outer perforated cylinder above the non-porous section 125.

The non-porous section 125 prevents gas from passing through. This increases the flow resistance in the lower portion of the reactor, preventing excessively high gas flow through openings under the louvers 70 in the lower portion of the reactor.

In some embodiments, the perforated cylinder size and/or fraction of open area of the outer perforated cylinder of a section B of the outer perforated cylinder 35 located above A is reduced compared to the perforated cylinder size and/or fraction of open area of the outer perforated cylinder of a section C which is located above section B. The height of Section B is typically about 5 to 10% of the total height of sections B and C.

The design of the centerpiece with louvers is described in U.S. Pat. No. 8,071,046, which is incorporated herein by reference. In this design, a plurality of cylindrical sections are stacked in the center of a reactor to form a centerpipe with openings. Each cylindrical section has an upper edge, a lower edge and cylindrical diameter. The wall of the cylindrical section has openings distributed over the wall to allow fluid to pass through the cylindrical sections. There are a plurality of conically shaped frustums (louvers), wherein each frustum has an upper edge with an upper diameter and a lower edge with a lower diameter, and where the lower diameter is greater than the upper diameter, and where the upper diameter is substantially equal to the cylindrical diameter. The frustums typically form an angle with the centerline between 5 and 20 degrees. The frustums are stacked in a manner such that the lower edge of a frustum extends below the upper edge of the neighboring frustum disposed beneath the frustum.

In some embodiments, there is a profile wire screen adjacent to the inner perforated cylinder on the catalyst bed side, instead of the louvers as shown in FIGS. 2-7. Although the flow patterns would not be the same with the profile wire screen as they are with the louvers, the aerated baseplate and/or non-porous section of the outer perforated pipe can be used and will provide similar benefits.

In this arrangement, there is a centerpipe made of a perforated inner annular plate and an outer annular profile wire screen. Fluid flows from an inlet through the centerpipe and passes through the plate openings and out of the screen to contact the catalyst. The profile wire screen(s) are formed into a generally tubular or cylindrical shape extending vertically within the generally vertical annular reactor about a central axis thereof. The screen can be a mesh, either wire or other material, or a punched plate. The screens or meshes used to hold the catalyst particles within a bed are sized to have apertures sufficiently small that the particles cannot pass through.

Typically, there is a profile wire screen adjacent to the outer perforated cylinder on the catalyst bed side.

The dehydrogenation of paraffinic hydrocarbons is well known to those skilled in the art of hydrocarbon processing. In the dehydrogenation process, fresh hydrocarbon feed is combined with recycle hydrogen and unconverted hydrocarbons. Dehydrogenatable hydrocarbons preferably include isoalkanes having 3 or 5 carbon atoms. A suitable feed of dehydrogenatable hydrocarbons will often contain light hydrocarbons (i.e., those having less carbon atoms than the primary feed components) which, for the purpose of reaction, serve as contaminants. In most cases, olefins are excluded from the dehydrogenation zone recycle in order to avoid the formation of dienes which produce unwanted by-products in many of the olefin conversion processes. Along with the dehydrogenatable hydrocarbons, the feed to the dehydrogenation zone comprises an $H_2$-rich stream, preferably containing at least 75 mol-% $H_2$. The $H_2$ acts to suppress the formation of hydrocarbonaceous deposits on the surface of the catalyst, more typically known as coke, and can act to suppress undesirable thermal cracking. Because $H_2$ is generated in the dehydrogenation reaction and comprises a portion of the effluent, the $H_2$-rich stream introduced into the reaction zone generally comprises recycle $H_2$ derived from separation of the dehydrogenation zone effluent. Alternately, the $H_2$ may be supplied from suitable sources other than the dehydrogenation zone effluent.

The combined stream of hydrogen and hydrocarbons is passed through a suitable bed of dehydrogenation catalyst maintained at the proper dehydrogenation conditions such as temperature, pressure and space velocity, and the effluent from the catalytic reaction zone is processed further to yield a stream of olefinic hydrocarbons.

The dehydrogenation reaction is a highly endothermic reaction which is typically effected at low (near atmospheric) pressure conditions. The precise dehydrogenation temperature and pressure employed in the dehydrogenation reaction zone will depend on a variety of factors, such as the composition of the paraffinic hydrocarbon feedstock, the activity of the selected catalyst, and the hydrocarbon conversion rate. In general, dehydrogenation conditions include a pressure of from about 0 MPa (0 bar) to about 3.5 MPa (35 bars) and a temperature of from about 480° C. (900° F.) to about 760° C. (1400° F.). A suitable hydrocarbon feedstock is charged to the reaction zone and contacted with the catalyst contained therein at an LHSV of from about 1 to about 10. Hydrogen, principally recycle hydrogen, is suitably admixed with the hydrocarbon feedstock in a mole ratio of from about 0.1 to about 10. Preferred dehydrogenation conditions, particularly with respect to $C_4$-$C_5$ paraffinic hydrocarbon feedstocks, include a pressure of from about 0 MPa (0 bar) to about 0.5 MPa (5 bars) and a temperature of from about 540° C. (1000° F.) to about 705° C. (1300° F.), a hydrogen-to-hydrocarbon mole ratio of from about 0.1 to about 2, and an LHSV of less than 4.

The dehydrogenation zone may use any suitable dehydrogenation catalyst. Generally, preferred suitable catalyst comprises a Group VIII noble metal component (e.g., platinum, iridium, rhodium, and palladium), an alkali metal component, and a porous inorganic carrier material. The catalyst may also contain promoter metals which advantageously improve the performance of the catalyst. The porous carrier material should be relatively refractory to the conditions utilized in the reaction zone and may be chosen from those carrier materials which have traditionally been utilized in dual function hydrocarbon conversion catalysts. A preferred porous carrier material is a refractory inorganic oxide, with the most preferred an alumina carrier material. The particles are usually spheroidal and have a diameter of from about 1/16 to about 1/8 inch (about 1.6 to about 3.2 mm), although they may be as large as about 1/4 inch (about 6.4 mm).

Operation of the dehydrogenation zone will produce a mixture of hydrogen and hydrocarbons. Normally, a portion of the hydrocarbons will include an equilibrium mixture of the desired olefin and its alkane precursor. The effluent from the dehydrogenation reaction section passes to a hydrogen recovery section. This separation section removes hydrogen from the effluent and recovers it in high purity for recycle to the dehydrogenation reaction section. Separation steps for the removal of hydrogen will normally include cooling and compressing with subsequent cooling and flashing in a separation vessel. Such methods for the separation of hydrogen and light gases are well known by those skilled in the art.

A typical dehydrogenation process passes the combined hydrocarbon and hydrogen feed through a plurality of reactors with interstage heating between the reactors. The feed hydrocarbons and hydrogen are initially heated by indirect heat exchange with the effluent from the dehydrogenation zone. Following heating, the feed mixture normally passes through a heater to further increase the temperature of the feed components before it enters the dehydrogenation reactor where it is contacted with the dehydrogenation catalyst. The endothermic reaction reduces the temperature of the reactants which then undergo interstage heating before entering the next reactor. After heat exchange with the feed, the effluent from the last dehydrogenation zone effluent passes to product separation facilities.

Another process utilizing radial bed reactors is catalytic reforming. Typically in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 80° C. (about 180° F.) and an end boiling point of about 205° C. (about 400° F.). The reactor inlet temperatures can range from about 450° to about 560° C. (about 840° to about 1040° F.). The catalytic reforming process can be particularly applicable to the treatment of straight run gasolines comprised of relatively large concentrations of naphthenic and substantially straight chain paraffinic hydrocarbons, which can be subject to aromatization through dehydrogenation and/or cyclization reactions.

Reforming may be defined as the dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Reforming is generally an endothermic process; therefore, in an embodiment the hydrocarbon stream is passed through a series of reaction zones and inter-stage heaters to provide the heat of reaction. Further information on reforming processes may be found in, for example, U.S. Pat. No. 4,409,095 (Peters).

A catalytic reforming reaction is normally effected in the presence of catalyst particles comprised of one or more Group VIII noble metals (e.g., platinum, iridium, rhodium, and palladium) and a halogen combined with a porous carrier, such as an alumina. The particles are usually spheroidal and have a diameter of from about 1/16th to about 1/8th inch (about 1.6 to about 3.2 mm), although they may be as large as about 1/4th inch (about 6.4 mm). Exemplary catalysts are disclosed in U.S. Pat. No. 6,034,018 (Sechrist et al.). During the course of a reforming reaction, catalyst particles may become deactivated as a result of mechanisms such as the deposition of coke on the particles; that is, after a period of time in use, the ability of catalyst particles to promote reforming reactions can decrease to the point that the catalyst is no longer useful. The catalyst must be reconditioned, or regenerated, before it can be reused in a reforming process.

In one preferred form, the reformer will employ a moving bed reaction zone and regeneration zone. Generally, fresh catalyst particles are fed to a reaction zone, which may be comprised of several subzones, and the particles flow through the zone by gravity-assisted transfer. Catalyst may be withdrawn from the bottom of the reaction zone and transported to a regeneration zone where a multi-step regeneration process can be used to remove the coke deposits and recondition the catalyst to restore its reaction promoting ability. Generally, the regeneration zone contains oxygen and generally operates at about 370° to about 538° C. (about 700° to about 1000° F.). Typically, catalyst flows by gravity-assisted transfer through the various regeneration steps and then is withdrawn from the regeneration zone at temperatures usually no greater than about 200° C. (about 400° F.) and furnished to the reaction zone. Catalyst that is withdrawn from the regeneration zone can be termed regenerated catalyst. Movement of catalyst through the zones is often referred to as continuous though, in practice, it may be semi-continuous. Semi-continuous movement can mean the repeated transfer of relatively small amounts of catalyst at closely spaced points in time. As an example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system can have the advantage of maintaining production while the catalyst is removed or replaced.

Still another process using a radial bed reactor is dehydrocyclodimerization. In the dehydrocyclodimerization reaction zone, $C_2$-$C_6$ aliphatic hydrocarbons are converted into aromatic hydrocarbons. The conversion of $C_2$-$C_6$ paraffins and olefins to aromatic hydrocarbons (dehydrocyclodimerization) may be expressed in terms of a three-stage process involving dehydrogenation, oligomerization, and aromatization reactions. While the reaction stages will be described as occurring sequentially, it is to be understood that all three reactions will take place simultaneously within the dehydrocyclodimerization reaction zone. The first reaction stage involves the dehydrogenation of paraffins to form olefins. Olefins may be derived from paraffins by the direct dehydrogenation of a paraffin to form the corresponding olefin and hydrogen or by carbon-carbon fission to produce lower alkanes and olefins. At temperatures thermodynamically favoring dehydrogenation (i.e., temperatures of about 500°-700° C.), the direct dehydrogenation reaction competes with the carbon-carbon fission reaction. At these temperatures and in the absence of a dehydrogenation catalyst, the predominant mechanism is fission of the carbon-carbon bond (C—C) which has a lower bond energy than the carbon-hydrogen bond (C—H). The higher the alkane, the greater the tendency toward carbon-carbon fission. In the case of propane, two decomposition reactions are possible, one leading to propylene and the free hydrogen, the other to ethylene and methane, with the latter slightly predominating. In the case of butane, the predominant reaction is fission at the end of the carbon chain to produce propylene and methane, with the next predominant reaction being fission of the interior carbon atoms to produce ethane and ethylene. Only a minor amount of direct dehydrogenation resulting in butenes and free hydrogen takes place.

Ethylene, ethane, and methane are the least desirable products of the carbon fission reaction. Methane remains in the reactor system as a refractory product. In a desired reaction, ethane may be dehydrogenated to ethylene prior to oligomerization to larger hydrocarbons. This reaction however occurs slowly and due to the speed and frequency of the undesirable ethylene hydrogenation reaction, the dehydrogenation reaction does not substantially alter the ethane concentration in the reaction mixture. In fact, the concentration of ethane in the reaction mixture will increase with increasing reactor residence time due to the dominance of the ethylene hydrogenation reaction in comparison to the ethylene oligomerization or ethane dehydrogenation reactions. The ethylene carbon fusion reaction products as previously explained may be hydrogenated to ethane or oligomerized.

In the second stage of the conversion process, the olefins undergo oligomerization to produce cyclic naphthenes. The naphthenes are then dehydrogenated in the third stage of the conversion process to produce the corresponding aromatic compounds. The cyclic naphthenes include saturated cycloalkanes and unsaturated alicyclic compounds with the former usually predominating. The predominant cyclic naphthenes produced in the second stage are six-member cyclic rings substituted with one or two alkyl groups containing a total of 1 to 12 carbon atoms. These cyclic naphthenes are dehydrogenated to produce the corresponding aromatic hydrocarbons, e.g. benzene, toluene, ethylbenzene, xylenes, and other alkyltoluenes.

The operating conditions which will be employed in the dehydrocyclodimerization reaction zone will, of course, vary depending on such factors as feedstock composition and desired conversion. A desired range of conditions for the dehydrocyclodimerization of $C_2$-$C_6$ aliphatic hydrocarbons to aromatics include a temperature from about 350° to about 650° C., a pressure from about 10.1 kPa (0.1 atm) to about 2.0 MPa (20 atm), and a liquid hourly space velocity from about 0.2 to about 10 hr$^{-1}$. The preferred process conditions are a temperature in the range from about 400° C. to about 600° C., a pressure in or about the range from 25 kPa (0.25 atm) to 1.0 MPa (10 atm), and a liquid hourly space velocity of between 0.5 and 5 hr$^{-1}$. It is understood that as the average carbon number of the feed increases, a temperature in the lower end of temperature range is required for optimum performance and, conversely, as the average carbon number of the feed decreases, the higher the required reaction temperature.

The feed stream to the dehydrocyclodimerization process is defined herein as those streams introduced into the dehydrocyclodimerization reaction zone which provide reactants for the three dehydrocyclodimerization reactions mentioned hereinabove. Included in the feed stream are $C_2$-$C_6$ aliphatic hydrocarbons. By $C_2$-$C_6$ aliphatic hydrocarbons, it is meant that the feed stream may comprise one or more open, straight, or branched chain isomers having from about 2 to 6 carbon atoms per molecule. Furthermore, the hydrocarbons in the feedstock may be saturated or unsaturated. Preferably, the hydrocarbons, $C_3$ and/or $C_4$, are selected from isobutane, normal butane, isobutene, normal butene, propane, and propylene. Diluents, refractory or reactant in nature, may also be included in the feed stream. Examples of such diluents include hydrogen, nitrogen, helium, methane, argon, neon, CO, $CO_2$, $H_2O$ or its precursors. Water precursors are defined as those compounds which liberate $H_2O$ when heated to dehydrocyclodimerization reaction temperatures. Methane and hydrocarbons greater than $C_6$ aliphatic hydrocarbons may also be components of the feedstock of the instant invention. The methane component is generally but not always a refractory reactant. The $C_{6+}$ aliphatic components while participating in the reactions are more efficiently handled by reforming. In any case, it is expected that the inclusion of such components in the feed will detrimentally affect the reaction kinetics of the dehydrocyclodimerization reaction.

The $C_2$-$C_6$ aliphatic hydrocarbon feed stream is contacted with the catalytic composite in a dehydrocyclodimerization reaction zone maintained at dehydrocyclodimerization conditions. This contacting may be accomplished by using a catalytic composite in a fixed bed system, a moving bed system, a fluidized bed system, or in a batch-type operation; however, in view of the fact that attrition losses of the valuable catalyst should be minimized and of the well-known operational advantages, it is preferred to use either a fixed bed catalytic system or a dense phase moving bed system such as is shown in U.S. Pat. No. 3,725,249. In a dense-phase moving bed system, the feed stream is preheated by any suitable heating means to the desired reaction temperature and then passed into a dehydrocyclodimerization zone containing a bed of the catalytic composite of this invention. It is, of course, understood that the dehydrocyclodimerization zone may be one or more separate reactors with suitable means therebetween to assure that the desired conversion temperature is maintained at the entrance to each reactor. The reactants may be in the liquid phase, admixed liquid-vapor phase, or a vapor phase when they contact the catalyst, with the best results obtained in the vapor phase. The dehydrocyclodimerization system then preferably comprises a dehydrocyclodimerization zone containing one or more dense-phase moving beds of a dehydrocyclodimerization catalytic composite.

In a multiple bed system, the dehydrocyclodimerization zone may be one or more separate reactors with suitable heating means therebetween to compensate for any heat loss encountered in each catalyst bed. Specific to the dense-phase moving bed system, it is common practice to remove catalyst from the bottom of the reaction zone, regenerate it by conventional means known to the art, and then return it to the top of the reaction zone.

The dehydrocyclodimerization catalyst useful in the present process may be any catalyst of the prior art known to have the capability to convert light aliphatic hydrocarbons into aromatic hydrocarbons. Examples of such catalysts are disclosed in U.S. Pat. Nos. 6,617,275, 4,654,455, 4,746,763, 4,499,315 and 4,720,602, which are incorporated herein by reference. Additionally, it should be noted that the dehydrocyclodimerization process need not be accomplished in a single reaction zone but may be replaced by any combination process that is capable of producing an aromatic-containing hydrocarbon product from a light aliphatic hydrocarbon product such as disclosed in U.S. Pat. No. 4,705,908 or Canadian Pat. No. 1,237,447. However, a single reaction system containing a single dehydrocyclodimerization catalyst is preferred.

The preferred catalyst useful in the dehydrocyclodimerization reaction zone of the instant process comprises a phosphorus-containing alumina, a Group IIB, IIIB, or IVB metal component from the Periodic Table of the Elements, especially a gallium component, and a crystalline aluminosilicate zeolite having a silica-to-alumina ratio of at least 12. The preferred catalyst is further characterized in that the crystalline aluminosilicate is ZSM-5 and is present in an amount ranging from 35 to 59.9 wt. %. In addition, the most preferred catalyst comprises from 0.1 to 5 wt. % gallium and from 40 to 60 wt. % of a phosphorus-containing alumina component. Such a catalyst is described in U.S. Pat. No. 4,636,483 which is incorporated herein by reference.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A radial bed reactor with an inclined baseplate comprising:
   a reactor body;
   inner and outer perforated cylinders defining a catalyst bed, the catalyst bed having an inlet at an upper end of the catalyst bed and an outlet at a lower end of the catalyst bed, a first portion of the outer perforated cylinder extending below a bottom of the inner perforated cylinder, the first portion having a non-porous section;
   a baseplate extending from the bottom of the inner perforated cylinder toward a bottom of the outer perforated cylinder, the baseplate being inclined with respect to the inner perforated cylinder;
   a distribution space defined by at least the inner perforated cylinder;
   a collection space defined by the outer perforated cylinder and the reactor body;
   a feed inlet to the distribution space; and
   a product outlet from the collection space.

2. The reactor of claim 1 wherein the first portion of the outer perforated cylinder further comprises a porous section, the porous section positioned below the non-porous section.

3. The reactor of claim 1 wherein the inner perforated cylinder further comprises louvers on the catalyst bed side.

4. The reactor of claim 3 wherein the non-porous section extends below a bottom of a lowest louver.

5. The reactor of claim 2 wherein a hole size, a fraction of open area, or both of the porous section are different from a hole size, a fraction of open area, or both of the outer perforated cylinder.

6. The reactor of claim 1 wherein a second portion of the outer perforated cylinder has a first section and a second section, wherein the first section of the second portion is above the non-porous section of the first portion, and wherein a hole size, a fraction of open area, or both of the first section of the second portion are smaller than a hole size, a fraction of open area, or both of the second section of the second portion.

7. The reactor of claim 6 wherein the inner perforated cylinder further comprises louvers on the catalyst bed side and wherein the first section of the second portion extends upward a distance of about 5-10% of a height of the first and second sections of the second portion.

8. The reactor of claim 1 wherein the baseplate is inclined at an angle in the range of about 30° to about 85°.

9. The reactor of claim 1 further comprising a profile wire screen adjacent to the inner perforated cylinder on the catalyst bed side.

10. A radial bed reactor with an inclined baseplate comprising:
    a reactor body;
    inner and outer perforated cylinders defining a catalyst bed, the catalyst bed having an inlet at an upper end of the catalyst bed and an outlet at a lower end of the catalyst bed, the outer perforated cylinder extending below a bottom of the inner perforated cylinder;
    a baseplate extending from the bottom of the inner perforated cylinder toward a bottom of the outer perforated cylinder, the baseplate being inclined with respect to the inner perforated cylinder, the baseplate having at least one porous portion;
    a distribution space defined by at least the inner perforated cylinder;
    a collection space defined by the outer perforated cylinder and the reactor body;
    a feed inlet to the distribution space; and
    a product outlet from the collection space.

11. The reactor of claim 10 wherein the inner perforated cylinder has louvers on the catalyst bed side.

12. The reactor of claim 10 further comprising an extension plate at the bottom of the inner perforated cylinder, and a feed inlet through the extension plate.

13. The reactor of claim 12 wherein the at least one porous portion comprises at least one hole, the at least one hole being covered with profile wire, wire mesh, or perforated material.

14. The reactor of claim 12 wherein the at least one porous portion comprises at least one circumferential profile wire, wire mesh section, or perforated material section, and wherein the baseplate comprises alternating non-porous sections and porous sections.

15. The reactor of claim 10 further comprising an extension plate at the bottom of the inner perforated cylinder, a support plate extending from the extension plate to the baseplate, and a process gas inlet through the support plate.

16. The reactor of claim 10 wherein the at least one porous portion comprises at least one hole, the at least one hole being covered with profile wire, wire mesh, or perforated material.

17. The reactor of claim 10 wherein the at least one porous portion comprises at least one wire mesh section, and wherein the baseplate comprises alternating non-porous sections and wire mesh sections.

18. The reactor of claim 10 wherein the baseplate is inclined at an angle in the range of about 30° to about 85°.

19. The reactor of claim 10 further comprising a profile wire screen adjacent to the inner perforated cylinder on the catalyst bed side.

* * * * *